United States Patent

Maruyama et al.

Patent Number: 5,774,468
Date of Patent: Jun. 30, 1998

[54] TERMINAL UNIT FOR WIRELESS COMMUNICATION NETWORK

[75] Inventors: Hidenori Maruyama; Yoshikazu Ikegami, both of Tokyo, Japan

[73] Assignee: NEC Corporation, Tokyo, Japan

[21] Appl. No.: 553,025

[22] Filed: Nov. 3, 1995

[30] Foreign Application Priority Data

Nov. 8, 1994 [JP] Japan .................................. 6-273296

[51] Int. Cl.[6] ...................................................... H04J 3/02
[52] U.S. Cl. ......................... 370/445; 370/347; 370/462; 375/222
[58] Field of Search .................................... 370/320, 335, 370/347, 348, 349, 350, 407, 462, 445, 310; 375/222; 455/11.1

[56] References Cited

U.S. PATENT DOCUMENTS

| | | | |
|---|---|---|---|
| 4,590,467 | 5/1986 | Lare ........................................ | 370/462 |
| 5,068,916 | 11/1991 | Harrison et al. ......................... | 370/350 |
| 5,355,375 | 10/1994 | Christensen ............................. | 370/407 |
| 5,369,639 | 11/1994 | Kamerman et al. ..................... | 370/347 |
| 5,559,804 | 9/1996 | Amada et al. ........................... | 370/347 |

*Primary Examiner*—Douglas W. Olms
*Assistant Examiner*—Shick Hom

[57] ABSTRACT

A terminal unit for a wireless communication network includes a wireless modem, a wire network controller, and a CPU. The modem can check whether a RTS signal is inputted or not during reception of communication data, and modulates communication data and performs wireless transmission of the data in response to the RTS signal when no communication data is being received, while it temporarily outputs a CTS signal and disables it thereafter in response to the RTS signal when communication data is being received. Upon reception of a data transmission request from the terminal unit, the controller outputs the RTS signal to the modem after completion of reception of communication data when the data is being received, or outputs the RTS signal to the modem when no communication data is being received. The controller determines interruption of data transmission and outputs a RTI signal when the CTS signal from the modem is temporarily input and disabled thereafter. The CPU requests the controller to perform data transmission, performs back-off processing upon reception of the RTI signal, and causes the controller to generate a RTS signal to the modem after a determined back-off period.

2 Claims, 2 Drawing Sheets

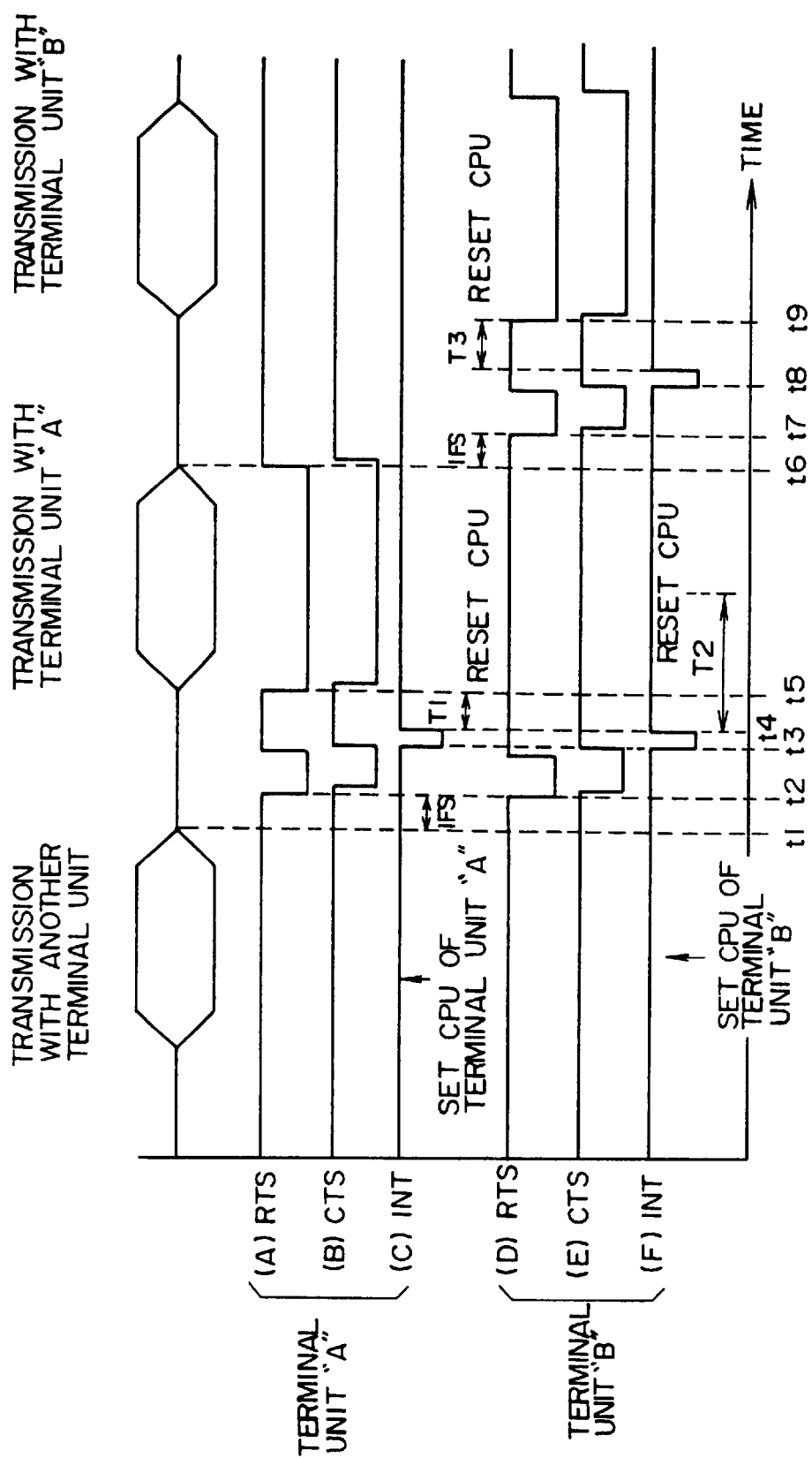

TERMINAL UNIT FOR WIRELESS COMMUNICATION NETWORK

BACKGROUND OF THE INVENTION

1. Field of the Invention

The present invention relates to a terminal unit for a wireless communication network and, more particularly, to a terminal unit for a wireless local area network (LAN) which can perform an access operation by the CSMA (Carrier Sense Multiple Access) scheme.

2. Description of the Prior Art

In an information transfer system such as a private network system, a wire LAN using coaxial cables is often used. When, however, the layout or the like of such a wire LAN is to be changed, it takes much time and cost to lay out the LAN again. For this reason, a strong demand has arisen for a wireless LAN.

The LAN access control schemes are roughly classified into the centralized and distributed control schemes. According to centralized control, if one centralized control unit breaks down, the overall communication system breaks down. The reliability of the communication system is therefore low. In addition, according to centralized control, even a small system requires a centralized control unit. That is, as the size of the system decreases, it becomes more disadvantageous in terms of cost. For these reasons, standardization of LANs is premised on distributed control.

The following systems are based on the wireless LAN distributed control scheme: firstly, a system called an equally distributed control system in which the network includes no master station, and terminals directly perform communication with each other by transmitting/receiving radio waves through antennas; and secondly, a system called an access point distributed control system in which an access point serving as a repeater receives a radio wave transmitted from a given terminal through an antenna and radiates it to another terminal through the antenna.

In the above access point distributed control system, if, for example, the access point breaks down, all terminals cannot perform communication with each other. In both the equally distributed control system and the access point distributed control system, since transmission and reception are performed in the same frequency band, a given terminal cannot receive a radio wave from another terminal and properly demodulate and reproduce it as data, or recognize the presence of a signal, while transmitting a signal.

Even if, therefore, a collision between packets occurs during transmission of the packets, this collision cannot be detected. For this reason, neither systems use the CSMA/CD (Carrier Sense Multiple Access with Collision Detection) scheme as a protocol generally used in office LANs.

A conventional device therefore employs a CSMA protocol requiring no simultaneous transmission/reception at the sacrifice of throughput performance during a high-traffic period. Another conventional device employs, e.g., a method of transmitting a test signal to a predetermined band in a first predetermined period, when a given terminal is to transmit communication data, prior to the transmission of the communication data, determining a collision between signals if a test signal other than the transmitted test signal is received in a period in which the number of pulses in a second period including the first period is checked, thus enabling CSMA/CD, as disclosed in Japanese Patent Laid-Open No. 4-373343. With these protocols and methods, the systems cope with the specifications of wire LANs.

Assume that a CSMA protocol is used in the conventional wireless LAN access control scheme. In this case, if a wire LAN controller is used, neither the transmission side nor the reception side can recognize a collision in a radio zone, and hence collision detection cannot be performed. For this reason, when a plurality of terminals are simultaneously set in the transmission mode, the terminals start transmitting data at once upon completion of reception. The probability of collision therefore increases.

The former conventional device using the protocol requiring no simultaneous transmission/reception needs a dedicated LAN controller for wireless LANs. The latter conventional device capable of CSMA/CD also requires the above dedicated circuit, resulting in increases in size and cost.

SUMMARY OF THE INVENTION

The present invention has been made in consideration of the above problems, and has as its object to provide a terminal unit for a wireless communication network, which has a small circuit size and uses a LAN controller widely used in wire LANs while performing flexible back-off processing to enable access control based on the CSMA scheme.

In order to achieve the above object, according to the principal aspect of the present invention, there is provided a terminal unit for a wireless communication network, which transfers communication data by using a predetermined band, comprising a wireless modem having a function of determining whether an input is a request-to-send signal input as a transmission request during reception of communication data, the modem modulating communication data to be transmitted and performing wireless transmission of the data in response to the request-to-send signal input when no communication data is being received, and temporarily outputting a clear-to-send signal and disabling the clear-to-send signal thereafter in response to the request-to-send signal input when communication data is being received and demodulated, a wire network controller for, upon reception of a data transmission request from the terminal unit, generating and outputting the request-to-send signal to the wireless modem after completion of reception of communication data when the communication data is being received, and immediately generating and outputting the request-to-send signal to the wireless modem when no communication data is being received, the wire network controller determining interruption of transmission of transmission data and outputting a request-to-interrupt signal when the clear-to-send signal from the wireless modem is temporarily input and disabled thereafter, and control means for requesting the network controller to perform data transmission, performing back-off processing upon reception of the request-to-interrupt signal, and causing the network controller to generate a request-to-send signal to the wireless modem after a determined back-off period elapses.

According to another aspect of the present invention, there is provided a terminal unit for a wireless communication network, in which the control means in the principal aspect detects the request-to-interrupt signal by interruption or with a flag, and performs back-off processing according to an algorithm for randomly determining the back-off period upon detection of the request-to-interrupt signal.

As described above, according to the present invention, when a transmission request is generated during reception of communication data, the wire network controller outputs a request-to-send signal a predetermined period of time after the completion of the reception of the communication data.

In consideration of this, the wireless modem has the function of determining whether the request-to-send signal is a signal input during reception of communication data. When a transmission request is generated during reception of communication data, a clear-to-send signal can be disabled after it is output from the wireless modem to the network controller for a short period of time. With this operation, the network controller determines interruption of transmission of transmission data and causes the control means to perform back-off processing without a wire back-off circuit in the network controller. For this reason, a state-of-the-art wire network controller can be used as the network controller. Access control based on the CSMA scheme can therefore be realized without increasing the circuit size.

In addition, according to the present invention, since the control means performs back-off processing according to an algorithm for randomly determining the back-off period, the fixed back-off function in the wire network controller need not be used, thus making the system versatile. This allows an easy version up.

The above and other advantages, features and additional objects of the present invention will become manifest to those versed in the art upon making reference to the following detailed description and accompanying drawings in which preferred embodiments incorporating the principle of the present invention are shown by way of illustrative example.

BRIEF DESCRIPTION OF THE DRAWINGS

FIG. 2 shows timing charts A to F for explaining the operation of the embodiment in FIG. 1.

DETAILED DESCRIPTION OF PREFERRED EMBODIMENT

Figure 1:
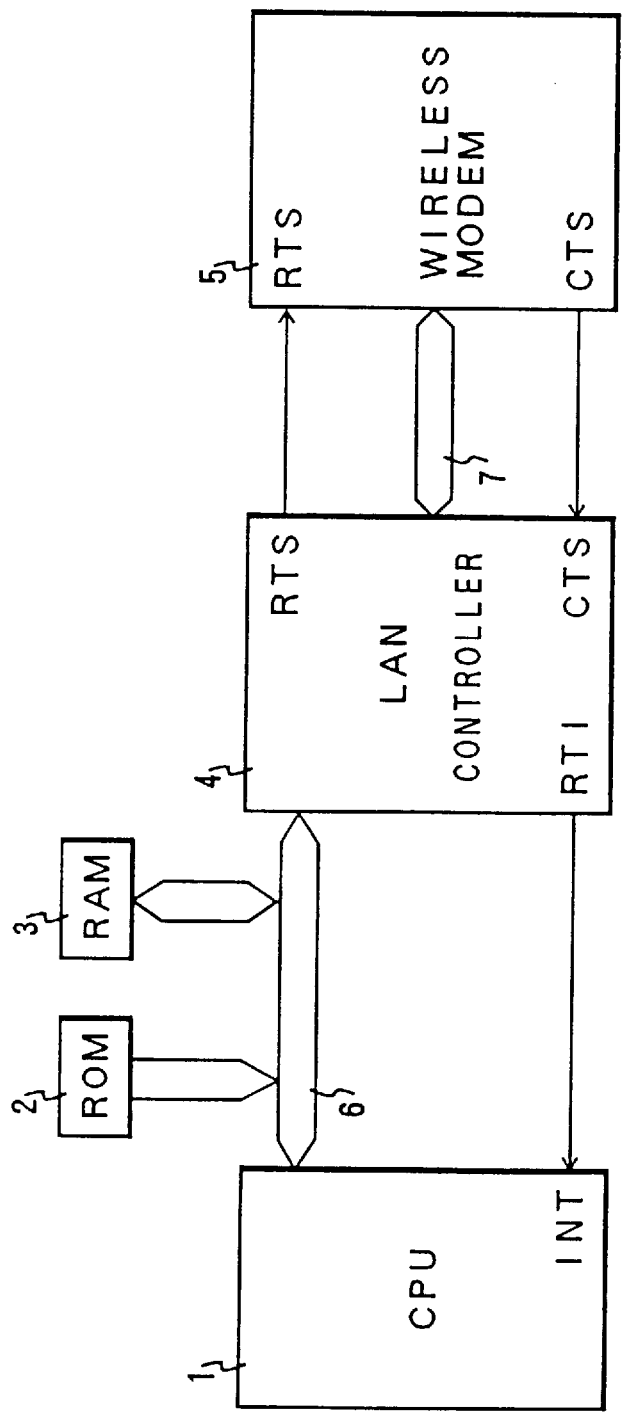
FIG. 1 is a block diagram showing the arrangement of an embodiment of the present invention.

An embodiment of the present invention will be described below with reference to the accompanying drawings. FIG. 1 is a block diagram showing the arrangement of an embodiment of the present invention. FIG. 2 shows are timing charts A to F for explaining the operation of the embodiment in FIG. 1. As shown in FIG. 1, this embodiment includes a central processing unit (CPU) 1, a read only memory (ROM) 2, random access memory (RAM) 3, a LAN controller 4, and a wireless modem 5.

The CPU 1 executes an algorithm function of randomly determining the back-off period for shifting the data transmission start timings of terminals from each other, issues transmission requests, and controls the timing at which each transmission request is issued. The ROM 2 stores software for controlling the operation of the CPU 1. The RAM 3 serves as a work area of the CPU 1 and the LAN controller 4. The CPU 1, the ROM 2, and the RAM 3 are connected to each other through a bus 6. The LAN controller 4 and the wireless modem 5 are connected to each other through a bus 7.

The LAN controller 4 is a state-of-the-art LAN controller exclusively used for wire LANs, which serves as an interface between the CPU 1 and the wireless modem 5. The wireless modem 5 performs processing such as modulation and demodulation of data, and interfaces with the LAN controller 4. In addition, the wireless modem 5 has a determination function of determining, on the basis of the time interval between the instant at which a request-to-send signal is input from the LAN controller 4 and the instant at which reception of reception data is completed, whether the transmission request is issued while the reception data is received, and a means for outputting a clear-to-send signal in accordance with the determination result.

The operation of this embodiment having the above arrangement will be described next. The LAN controller 4 is a wireless LAN controller, which monitors, on the basis of the presence/absence of a carrier detection signal input from the wireless modem 5 through the bus 7, whether communication data is being received. In addition, the LAN controller 4 detects whether this terminal has requested data transmission through the CPU 1. When the terminal has requested data transmission during reception of communication data, the LAN controller 4 outputs a request-to-send (RTS) signal to the wireless modem 5 a predetermined period of time after the completion of reception.

The wireless modem 5 has a means for detecting whether the request-to-send (RTS) signal was input the predetermine period of time after the completion of reception. If the RTS signal was input the predetermined period of time after the completion of reception, the wireless modem 5 determines this signal as an RTS signal for requesting data transmission during reception of communication data. As a result, the wireless modem 5 temporarily outputs a clear-to-send (CTS) signal to the LAN controller 4 to start transmitting a packet, but immediately disables the clear-to-send (CTS) signal to interrupt the transmission of the packet.

With this operation, the LAN controller 4 determines packet interruption, and outputs a request-to-interrupt (RTI) signal to the CPU 1. Upon detection of this request-to-interrupt (RTI) signal by interruption or with a flag, the CPU 1 determines the back-off period by, e.g., generating random numbers using an algorithm for randomly determining the back-off period, and outputs a request-to-send signal to the LAN controller 4 again after the determined back-off period.

As described above, according to this embodiment, since the wire LAN controller 4, which is widely used in general, can be used instead of a dedicated wireless LAN controller, access control based on the CSMA scheme can be realized without increasing the circuit size. In addition, the fixed back-off function in the wire LAN controller 4 is not used to make the system versatile. A version up can therefore be easily attained.

The above operation will be described in more detail with reference to the timing charts in FIG. 2. Assume that the signals in FIG. 2 are low active. When terminals A and B, each having an arrangement identical to that in FIG. 1, are to start transmitting signals to another terminal while it is transmitting a signal, the CPU 1 of each of the terminals A and B requests the LAN controller 4 to perform transmission (the CPU 1 is set).

The LAN controller 4 of each of the terminals A and B has detected, through the bus 7, that the wireless modem 5 is receiving a signal (detecting a carrier) from another terminal upon reception of the request-to-send signal. In this case, therefore, the LAN controller 4 outputs an RTS signal to the wireless modem 5 at time t2 at which an IFS (interval of frame spacing) period has elapsed since time t1, as shown in FIG. 2, timing charts A and D.

The wireless modem 5 of each of the terminals A and B, to which this RTS signal has been input, detects that the RTS signal has been input the IFS period after the completion of signal reception. At this time, the wireless modem 5 determines that the RTS signal has been input when transmission was requested during a transmitting operation of another terminal, and immediately outputs a clear-to-send (CTS)

signal to the LAN controller 4, thereby permitting transmission, as shown in FIG. 2, timing charts B and E. However, at time t3 at which a short period of time has elapsed, the wireless modem 5 disables the CTS signal to inhibit transmission.

The LAN controller 4 of each of the terminals A and B generates and outputs an RTI signal to the CPU 1, e.g., an interrupt terminal INT, of each of the terminals A and B in the interval between time t3 and time t4 upon completion of the transmitting operation of another terminal, as shown FIG. 2, timing charts C and F.

Upon detection of the RTI signal by interruption, the CPU 1 of each of the terminals A and B performs back-off processing by means of software, and determines the back-off period by generating random numbers. If a back-off period T1 of the terminal A is shorter than a back-off period T2 of the terminal B, only the CPU 1 of the terminal A outputs a transmission request command again at time t5 after the back-off period T1 to cause the LAN controller 4 to output an RTS signal, as shown in FIG. 2, timing chart A thereby causing the wireless modem 5 to transmit a packet.

In the terminal B, when the back-off period T2 ends, the terminal A is performing a transmitting operation. For this reason, the CPU 1 of the terminal B performs back-off processing to determine a back-off period T3 in the same manner as described above. The LAN controller 4 of the terminal B outputs an RTS signal to the wireless modem 5 at time t7 after the IFS period has elapsed since the completion of the transmitting operation of the terminal A, as shown in FIG. 2, timing chart D. The LAN controller 4 then immediately outputs a CTS signal to the LAN controller 4 to permit transmission, as shown in FIG. 2, timing chart E. At time t8 at which a short period of time has elapsed, however, the CPU 1 inhibits transmission.

With this operation, the LAN controller 4 of the terminal B generates and outputs an RTI signal to the terminal INT (interrupt terminal) of the CPU 1 of the terminal B, as shown in FIG. 2, timing chart F and causes the CPU 1 to output a transmission request command again at time t9 after the back-off period T3. The LAN controller 4 then outputs an RTS signal, as shown in FIG. 2, timing chart D to transmit a packet.

In this embodiment, if the algorithms for determining back-off periods are changed in the terminals A and B, the terminal A can perform transmission in preference to the terminal B. In addition, in the embodiment, when the input RTS signal is not an input received at a time near the IFS period after the completion of reception of communication data, the wireless modem 5 outputs a CTS signal to the LAN controller 4 to permit transmission, thereby transmitting a packet (communication data) (i.e., inhibiting the LAN controller 4 to output an RTI signal).

The present invention is not limited to the above embodiment. For example, the RTI signal may be detected by a CPU or an equivalent circuit with a flag.

What is claimed is:

1. A terminal unit for a wireless communication network, which transfers communication data by using a predetermined band, comprising:

a wireless modem having a function of determining whether an input is a request-to-send signal input as a transmission request during reception of communication data, said modem modulating communication data to be transmitted and performing wireless transmission of the data in response to the request-to-send signal input when no communication data is being received and demodulated, and temporarily outputting a clear-to-send signal and disabling the clear-to-send signal thereafter in response to the request-to-send signal input when communication data is being received;

a wire network controller coupled directly to said wireless modem, said controller responding to a reception of a data transmission request from said terminal unit by generating and outputting the request-to-send signal to said wireless modem after completion of a reception of communication data when the communication data is being received, and immediately generating and outputting the request-to-send signal to said wireless modem when no communication data is being received, said wire network controller determining interruption of transmission of transmission data and outputting a request-to-interrupt signal when the clear-to-send signal from said wireless modem is temporarily input and disabled thereafter; and control means coupled to said wireless network controller for requesting said network controller to perform data transmission, performing back-off processing upon reception of the request-to-interrupt signal, and causing said network controller to generate request-to-send signal to said wireless modem after a determined back-off period elapses.

2. The terminal unit according to claim 1, wherein said control means detects the request-to-interrupt signal by interruption or with a flag, and performs back-off processing according to an algorithm for randomly determining the back-off period upon detection of the request-to-interrupt signal.

\* \* \* \* \*